(No Model.)
H. C. HART.
MANUFACTURE OF SPOONS AND FORKS.
No. 460,374. Patented Sept. 29, 1891.
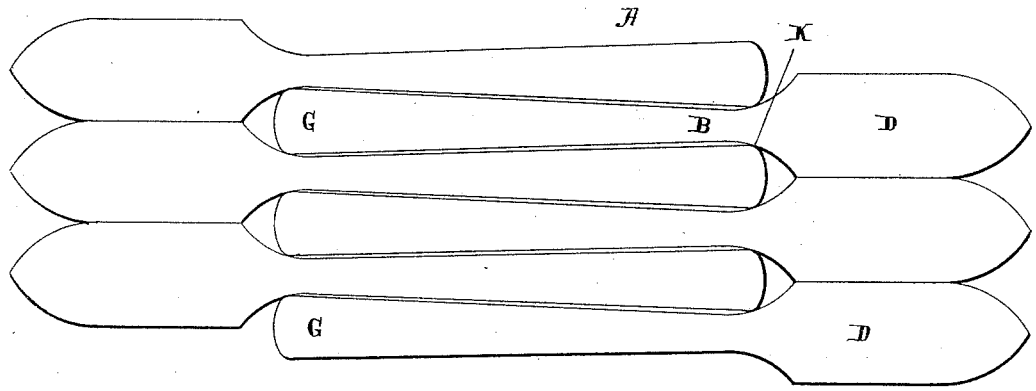
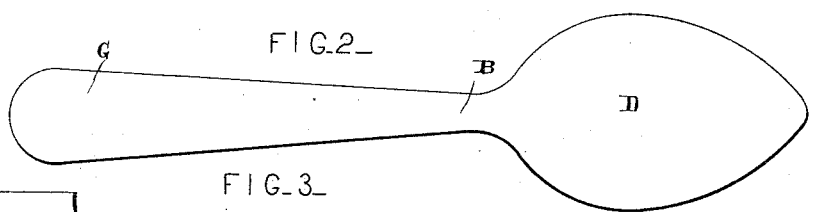
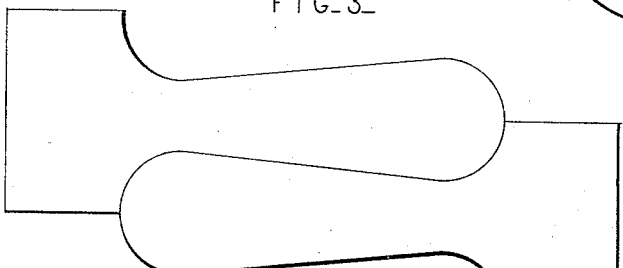
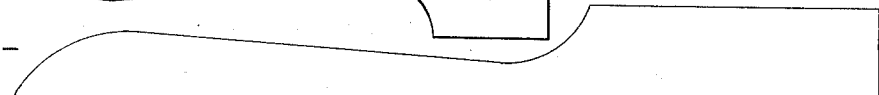
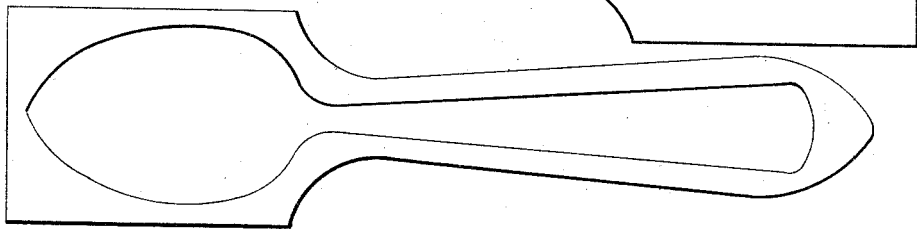
WITNESSES
Geo. E. Frech.
Roland H. Fitzgerald
INVENTOR
Hubert C. Hart
per Lehmann & Pattison
att'ys

UNITED STATES PATENT OFFICE.

HUBERT C. HART, OF UNIONVILLE, CONNECTICUT.

MANUFACTURE OF SPOONS AND FORKS.

SPECIFICATION forming part of Letters Patent No. 460,374, dated September 29, 1891.

Application filed June 10, 1891. Serial No. 395,788. (No model.)

*To all whom it may concern:*

Be it known that I, HUBERT C. HART, of Unionville, in the county of Hartford and State of Connecticut, have invented a certain new and useful Improvement in the Manufacture of Spoons and Forks; and I do hereby declare the following to be a full, clear, and exact description of the invention, such as will enable others skilled in the art to which it pertains to make and use it, reference being had to the accompanying drawings, which form part of this specification.

My invention relates to an improvement in the manufacture of spoons and forks; and it consists of a blank having a particular shape and the method of producing the article.

The object of my invention is to effect a saving of stock in the manufacture of spoons and forks over the ordinary method by means of a blank, and a method which will be fully described and illustrated hereinafter.

Figure 1 is a plan view showing the shape of my blanks as they are being cut from a sheet of metal. Fig. 2 is a plan view of a finished blank for a spoon. Fig. 3 is a plan view showing the ordinary shape of the blanks as they are cut from a sheet of metal by the old process. Fig. 4 shows the old blank after it is rolled in the usual way. Fig. 5 shows the old way of cutting the blank-spoon from the blank shown in Fig. 4.

The ordinary method of manufacturing spoons and forks is to cut a blank, as shown in Fig. 3, which is but little more than half as long as the finished article is to be. This blank is then rolled lengthwise until it is the desired length, which rolling produces a blank like that shown in Fig. 4. By this rolling they get the desired length and thickness of the article to be cut from this blank. After this blank is rolled to the desired length and thickness the article is cut from it, as shown in Fig. 5. By calculation it is found that sixty per cent. of the stock is waste, which necessarily increases the cost of the article that much, as the waste metal can only be sold as scraps and has very little value. Hence the necessity and desire for a method and a blank which will materially decrease the waste now made in stock will be appreciated.

Referring now to my improved blank and method, whereby I am enabled to effect a great saving in stock, A represents a sheet of metal from which the blanks are cut, and these blanks are interlocked, as shown. Instead of cutting the blank short and then rolling it the desired length, as in the old process just described, I cut the blanks in the first instance about the length the finished article is to be. The shank B of the blank is the width it is to be when finished near the bowl of the spoon, and the sheet A from which the blanks are cut is the proper thickness for the thickest part of the finished article, and the blank has straight edges for the bowl for the purpose of saving stock. The handle and bowl part of the blank is narrower than it is when finished. Taking one of these blanks of the shape shown in Fig. 1, I roll the bowl portion crosswise to get the desired width and thickness, in contradistinction to rolling the entire blank lengthwise, as in the old process. The width and thickness of the handle is obtained by flattening the blank at the desired point. This method produces a blank which is so near the shape of the finished article that there is but little waste of stock in finishing the bowl and handle to the desired shape, as will readily be understood. As shown in Fig. 1, there is but a very slight waste of stock around the shank B and handle G of the blank as compared to the waste by the old method, as shown in Fig. 5, and I am enabled in practice to produce spoons by my improved method so that there is but a waste of about twenty-five per cent. of stock as compared to a loss of sixty per cent by the old process.

In the manufacture of a fork the blank is the same shape as that shown for a spoon, except a square end, and differs only in that I roll the large end D of the blank lengthwise to get the proper length for the tongs of the fork, instead of crosswise.

It will be noticed that the contour of my blank is to have the ends of the handles to intersect the converging lines at the inner edge of the wide part D of the blank, as shown at K. The handle end then gradually and very slightly narrows, as shown, to make room for the end of the handle of the blank, which extends from the opposite edge of the sheet. My blank for a spoon also differs from the ordinary blank, in that it has its end slightly pointed, as shown.

Having thus described my invention, I claim—

1. A blank for spoons and forks, consisting of a wide portion D, having a handle portion of the length it is to be when finished, and which interlock as shown, substantially as shown.

2. A blank for forks and spoons, consisting of a wide portion having straight edges and a handle portion of about the length it is to be when finished, the said handle portions having the edges of their ends intersect the edges of the converging lines of the wide portion, substantially as shown.

3. A blank for spoons and forks, consisting of a wide portion having straight edges, a handle portion of about the length it is to be when finished, the shank of the handle of about a finished width, and the handles interlocking, as shown, substantially as described.

4. A blank for spoons, consisting of a wide portion having its outer end rounded or pointed, its edges straight, and the handle portion of about the length it is to be when finished, substantially as shown.

5. A spoon-blank having a handle portion and a bowl portion of about a finished length, the bowl portion being narrower than the finished width and having straight edges and rounded outer ends, substantially as set forth.

6. A method of making spoons and forks, consisting in cutting a blank of a thickness corresponding to the thickest part of the finished article and of about a finished length, and then widening the handle and bowl, respectively, to the desired width, substantially as specified.

7. A method of producing spoons and forks, consisting in cutting a blank having a shank of about the finished width, a handle and a bowl portion of a finished length, and then widening the handle and the bowl portion to the desired width, substantially as described.

8. A process of producing spoons, consisting in cutting a blank having a handle portion of about a finished length, a bowl portion of about a finished length, but narrower than when finished, then rolling the bowl portion crosswise to get the desired width, and flatting the handle portion to get the desired width, substantially as specified.

In testimony whereof I affix my signature in presence of two witnesses.

HUBERT C. HART.

Witnesses:
W. A. HITCHCOCK,
S. FRISBIE.